(12) United States Patent
Kwag et al.

(10) Patent No.: US 7,981,501 B2
(45) Date of Patent: Jul. 19, 2011

(54) LAMINATED COMPOSITES AND METHODS OF MAKING THE SAME

(75) Inventors: Choongyong Kwag, Royal Oak, MI (US); Chen-Shih Wang, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 0 days.

(21) Appl. No.: 12/692,021

(22) Filed: Jan. 22, 2010

(65) Prior Publication Data

US 2010/0136316 A1 Jun. 3, 2010

Related U.S. Application Data

(63) Continuation-in-part of application No. 12/326,362, filed on Dec. 2, 2008.

(51) Int. Cl.
 *B32B 27/04* (2006.01)
(52) U.S. Cl. .................... 428/300.7; 264/258
(58) Field of Classification Search .............. 428/372, 428/375, 300.7, 903, 293.4, 297.4; 423/447.1, 423/447.2; 442/346, 381, 393; 977/961; 264/258
See application file for complete search history.

(56) References Cited

U.S. PATENT DOCUMENTS

| | | | |
|---|---|---|---|
| 6,265,333 B1 | 7/2001 | Dzenis et al. | |
| 6,726,989 B2* | 4/2004 | Dugan | 428/372 |
| 7,083,854 B1* | 8/2006 | Joo et al. | 428/372 |
| 7,211,530 B2 | 5/2007 | Burrows | |
| 7,566,410 B2* | 7/2009 | Song et al. | 252/511 |
| 7,591,973 B2 | 9/2009 | Takano et al. | |
| 7,790,285 B2* | 9/2010 | Zhamu et al. | 428/402 |
| 7,832,983 B2* | 11/2010 | Kruckenberg et al. | 415/200 |
| 2008/0213498 A1 | 9/2008 | Drzal et al. | |
| 2009/0176112 A1* | 7/2009 | Kruckenberg et al. | 428/457 |
| 2010/0136316 A1* | 6/2010 | Kwag et al. | 428/293.4 |
| 2010/0140792 A1* | 6/2010 | Haddon et al. | 257/713 |
| 2010/0147188 A1* | 6/2010 | Mamak et al. | 106/31.13 |

OTHER PUBLICATIONS

Quaresimin et al., "Understanding the Effect of Nano-Nodifier Addition Upon the Properties of Fibre Reinforced Laminates", Composites Science and Tech 68(2008), pp. 718-726.

* cited by examiner

*Primary Examiner* — N. Edwards
(74) *Attorney, Agent, or Firm* — Dierker & Associates, P.C.

(57) ABSTRACT

The instant disclosure relates to a laminated composite and methods of making the same. The laminated composite includes a plurality of stacked prepregs having an interface formed between each pair of adjacent prepregs. Each prepreg includes a matrix material and reinforcing fibers dispersed therein. At least one fibrous veil is laminated to at least a portion of at least one of the interfaces, the at least one fibrous veil having graphite nano-platelets attached to at least one surface thereof.

17 Claims, 2 Drawing Sheets

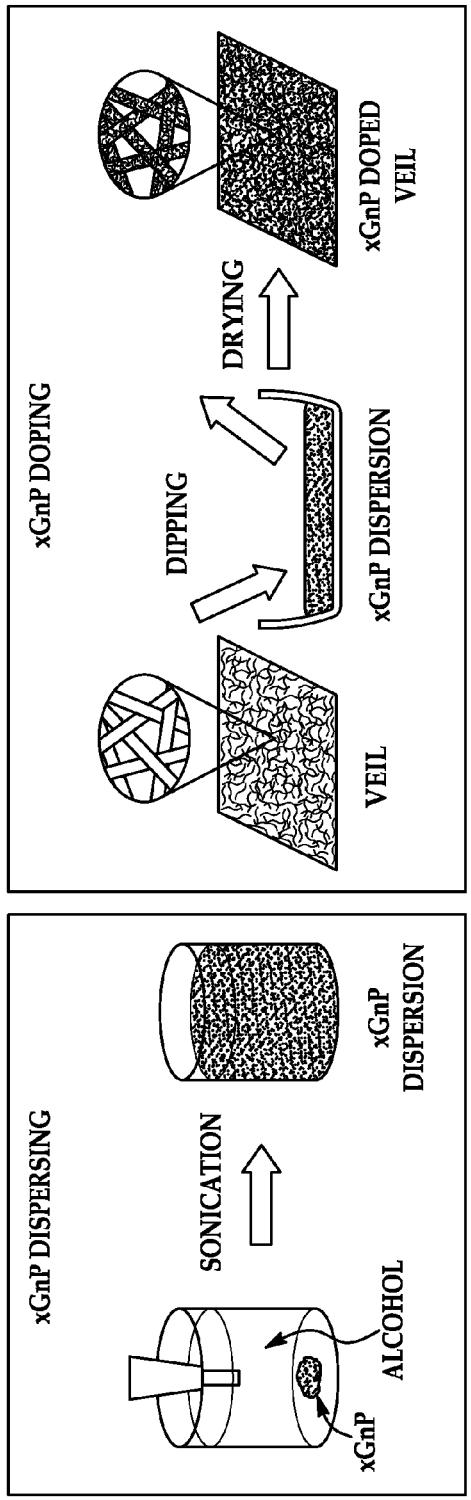
FIG. 1A
FIG. 1B
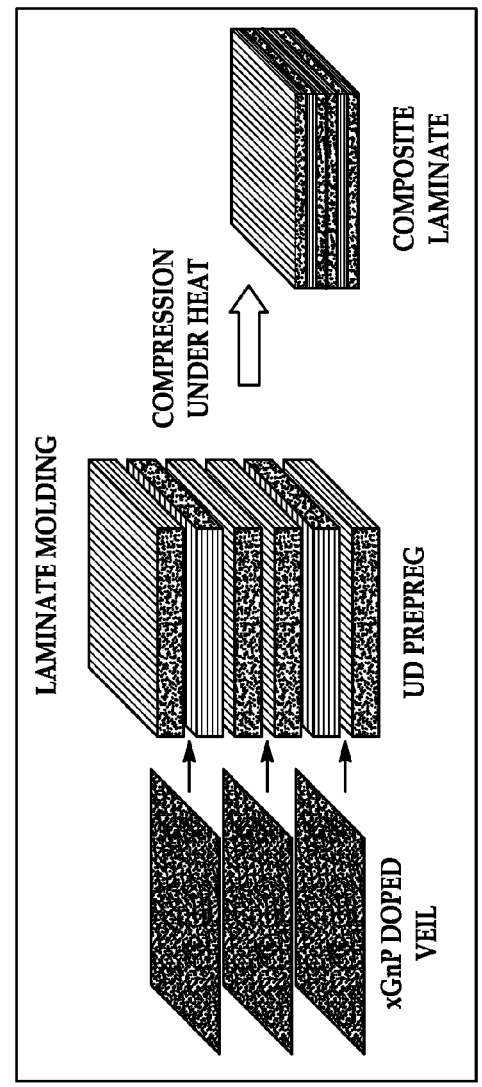
FIG. 1C

LAMINATED COMPOSITES AND METHODS OF MAKING THE SAME

CROSS REFERENCE TO RELATED APPLICATIONS

This application is a continuation-in-part of co-pending U.S. patent application Ser. No. 12/326,362, filed Dec. 2, 2008, entitled "Laminated Composites and Methods of Making the Same," which is incorporated by reference herein in its entirety.

TECHNICAL FIELD

The present disclosure relates generally to laminated composites and methods of making the same, and more particularly to laminated composites made with prepregs and fiber veils having graphite nano-platelets attached thereto.

BACKGROUND

Laminated composites made with carbon fiber-epoxy prepregs have been used for many applications. Enhanced impact properties of such laminated composites may be particularly desirable for certain automotive and engineering applications. Efforts to improve the impact properties of laminated composites include modifying the matrix resin properties or the laminate structure. The former is accomplished primarily by toughening the prepreg resin system utilizing appropriate toughening materials. The latter has been attempted by incorporating various interfaces between layers using smaller scale fibers.

SUMMARY

The instant disclosure relates to a laminated composite and methods of making the same. The laminated composite includes a plurality of stacked prepregs having an interface formed between each pair of adjacent prepregs. Each prepreg includes a matrix material and reinforcing fibers dispersed therein. At least one fibrous veil is laminated to at least a portion of at least one of the interfaces, the at least one fibrous veil having graphite nano-platelets attached to at least one surface thereof.

BRIEF DESCRIPTION OF THE DRAWING

Features and advantages of the present disclosure will become apparent by reference to the following detailed description and drawings.

FIGS. 1A, 1B and 1C are a series of schematic diagrams illustrating the steps of dispersing exfoliated graphite nano-platelets (xGnP) (labeled "xGnP Dispersing" in FIG. 1A), doping a veil with exfoliated graphite nano-platelets (labeled "xGnP Doping" in FIG. 1B), and performing laminate molding (labeled "Laminate Molding" in FIG. 1C);

DETAILED DESCRIPTION

Figure 2:
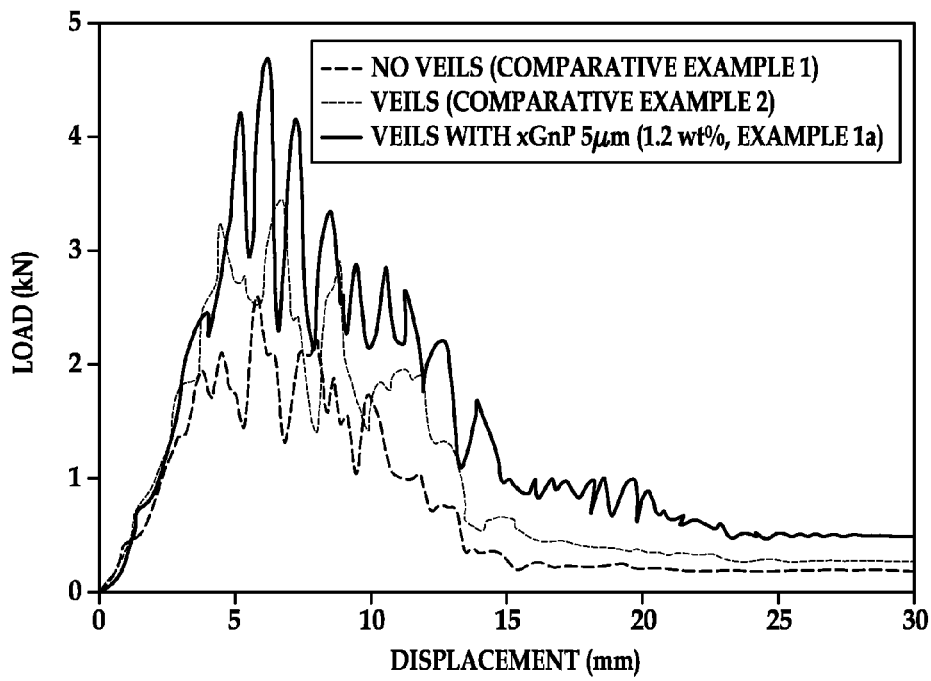
FIG. 2 is a graph of comparative impact load-displacement curves plotting Load (kN) vs. Displacement (mm) from a sample of the laminated composite disclosed herein and multiple comparative samples (i.e., no veils and undoped veils)

The laminated composite disclosed herein exhibits superior impact properties when compared to other known laminated composites. The composite of the examples disclosed herein includes small amounts of graphite nano-platelets strategically placed at the interfaces between multiple prepreg layers. These small amounts of graphite nano-platelets are attached to thin fibrous veils, which are used as carriers for the nano-platelets. As such, the graphite nano-platelets are not added to all of the fibers present in the final composite (e.g., the prepreg fibers), but rather are added to the fibrous veils positioned at the interfaces between prepreg layers. The graphite nano-platelet-doped fibrous veils advantageously increase the impact properties and reinforce weak interfaces of the resulting composite, without substantially increasing the weight or bulk (e.g., thickness) of the composite or increasing the cost of manufacturing.

The term "prepreg", as used herein, is a combination of matrix resin and fiber reinforcement which is ready for use in the manufacturing process disclosed herein under heat and pressure. In one example, the fibers of the prepreg have been impregnated with a pre-catalyzed matrix resin and partially cured (B-stage). A "lay-up" refers to the procedure of laying the prepreg, which has been pre-impregnated with the resin, outside or sometimes directly onto the mold. It is to be understood that in the method disclosed herein, the lay-up procedures also involve laying the graphite nano-platelet-doped veil (discussed further hereinbelow) between the prepregs.

In preparing the laminated composite disclosed herein, the lamination of the nano-platelet-doped veils onto the prepregs takes place during the lay-up process. One advantage of this technique is that it does not require any chemical or physical modifications of the existing prepregs. Modifying commercial prepregs is generally difficult and costly, at least in part because these materials are delicately balanced in their cure rate, viscosity-temperature behavior, and handling characteristics. It is to be understood that the method of making the laminated composite disclosed herein may be used with any prepreg. The technique is believed to be practical for implementation since it requires minimal, if any, alteration of the conventional prepregs and/or of the lay-up processes.

Another advantage of the method disclosed herein is that it uses a significantly smaller amount of the graphite nano-platelets, compared with the traditional methods of incorporating nanofibers into the entire prepreg resin matrix. For example, a previous study found in literature (see FIG. 12 in Quaresimin et al., "Understanding the effect of nano-modifier addition upon the properties of fibre reinforced laminates," *Composites Science and Technology*, Volume 68, Issues 3-4, March 2008, Pages 718-726) reported a 20% improvement in impact energy by adding 7.5 wt % of carbon nanofibers (CNF) to the prepreg itself. The technique of the present disclosure generates more than 20% improvement with less than 3 wt % of exfoliated graphite nano-platelets, and without having to incorporate the exfoliated graphite nano-platelets into the prepreg composition, as shown in Table 1 in the examples hereinbelow.

Still another advantage of the method disclosed herein is that any increases in thickness and weight of the parts molded from the laminated composite resulting from the process disclosed herein are minimal and likely negligible. For example, the thickness of the molded composite may be increased by about 0.01 mm to about 0.1 mm by including the doped veils. Therefore, the method disclosed herein is applicable without having to modify existing part design and manufacturing tooling and processes. The weight increase of the final parts may also be further minimized by utilizing lighter weight carbon fiber veils.

Generally, as shown in FIG. 1A, the method begins by dispersing a small amount of suitable exfoliated graphite nano-platelets into a desirable solvent or solution. Exfoliated graphite nano-platelets (xGnP) are nanoparticles that are made from graphite. The size of xGnP is represented by the average platelet diameter measured across the lateral dimension, such as 1, 5, 10, 15, 25 microns, etc. The particle size distribution is generally fitted to a normal distribution with a standard deviation of about ±35%. In some instances, the nanoparticles include small stacks of graphene that are 1 nm to 15 nm thick and have diameters ranging from sub-microns to 100 microns. In one non-limiting example, the average diameter of the graphite nano-platelets ranges from about 5 microns to about 15 microns. In some embodiments, a mixture of different sized graphite nano-platelets may also be used (e.g., a 1:1 weight ratio of 5 micron xGnP and 15 microns xGnP). It is believed that a blend may more readily disperse in the selected solvent, at least in part because of the size distribution.

Generally, the amount of graphite nano-platelets is selected such that the graphite nano-platelets disperse to achieve the desirable solution, and such that the resulting solution facilitates substantially even distribution of the graphite nano-platelets onto the fibrous veil. Furthermore, it is to be understood that the amount of graphite nano-platelets used may be varied, depending, at least in part, on the desirable enhanced level of the impact properties. In one embodiment, the amount of graphite nano-platelets dispersed in the solvent generally ranges from about 0.5 wt % to about 2 wt % of the total weight of the solvent.

Furthermore, it is desirable that the total amount of graphite nano-platelets in the final molded composite be small, thereby not significantly adding to the weight and bulk of the final product. In one non-limiting example, the total amount of graphite nano-platelets is less than 2 wt % of the final molded composite. For example, if three doped veils include 2 wt % of the total graphite nano-platelets in the composite resin matrix, then each veil contains about 0.7 wt % of graphite nano-platelets.

Non-limiting examples of suitable graphite nano-platelets include exfoliated graphite nano-platelets. Such nano-platelets are made from natural graphite having a strongly adhered multi-layered structure. The layers may be intercalated using various types of intercalants, such as alkali metals, metal halides, acids alkali metals, etc. By rapid heating, the intercalated graphite can be exfoliated to create expanded layers which can be further separated. The expanded graphite is pulverized to make exfoliated nano platelets of graphene.

It is desirable that the graphite nano-platelets be dispersed in the selected solvent or solution. Graphite nano-platelets are naturally hydrophobic, and thus an additive may be used in order to facilitate dispersion of the platelets in the selected solvent. In one non-limiting example, isopropyl alcohol is selected as the solvent and a colloidal nanosilica/isopropanol solution is selected as a dispersing agent. Other solvents that may be used include chlorinated hydrocarbons and/or aromatic solvents. Other dispersion additives/agents/aids that may be used include dimethyl sulfoxide, N-methyl-2-pyrrolidone, polyethylene glycol mono[4-(1,1,3,3-tetramethylbutyl)phenyl]ether, polyethylene glycol monoethyl ether, or the like.

The dispersion of the graphite nano-platelets in the selected solvent/solution may be accomplished by adding the graphite nano-platelets to the solvent/solution (including the dispersing aid) and exposing the mixture to sonication for a predetermined time. It is to be understood that the sonication time depends, at least in part, on the graphite nano-platelets and solvent/solution used, and the graphite nano-platelets' dispersibility into the solvent/solution. The temperature of the sonication bath is not strictly controlled, but the solution is kept relatively cool to prevent overheating by sonication. Such overheating may lead to rapid evaporation of the solvent and deterioration of the dispersion efficiency. the. The sonication time may also depend upon the maximum duration that the dispersed state may be maintained before phase separation begins.

Referring now to FIG. 1B, thin, dry, fibrous veils are dipped into the graphite nano-platelet-dispersed solution, thereby doping the veils with the graphite nano-platelets. One non-limiting example of a fibrous veil is a glass, carbon, or polymeric fibrous veil. The veils are allowed to soak for a predetermined time in the graphite nano-platelet-dispersed solution such that the graphite nano-platelets adhere to one or more exposed surfaces of the veil. This doping process is accomplished in the absence of any sizing materials/agents, such as, for example, polymeric binders.

The doped veil(s) is/are then dried. Drying can be accomplished by evaporating the solvent for a predetermined time at a predetermined temperature (a non-limiting example of which is room temperature).

The dried doped veil(s) is/are laminated at an interface between adjacent prepregs using standard lay-up procedures. As previously mentioned, any desirable prepreg may be used. In one non-limiting example, the prepregs are uni-directional carbon fiber/epoxy prepregs including at most 35 wt % epoxy resin and at least 65 wt % carbon fibers. In terms of fiber structure, prepregs made of woven fabrics (such as plain, satin, twill, etc.), or multi-axial fabrics (such as non-crimp) may be used. Non-limiting examples of suitable prepreg fiber materials include carbon, glass, boron, and polymers. The carbon fibers in the prepregs may be, for example, 12K carbon fibers or 24K carbon fibers. Non-limiting examples of suitable prepreg matrix resins include epoxy resins, phenolic resins, polyester resins, vinyl ester resins, polyimide resins, thermoplastic resins, etc.

After being laminated together, the prepregs having the doped veil between the interfaces are molded into a composite part, using, for example, compression molding techniques (see, for example, FIG. 1C). Other non-limiting examples of suitable molding techniques include the vacuum bag process and the autoclave process.

To recap, FIGS. 1A through 1C illustrate schematic drawings of a) graphite nano-platelets (xGnP) being dispersed in alcohol by sonication; b) a fibrous veil being dipped in the xGnP dispersion and then dried; and c) xGnP doped veils being placed in the interfaces between several layered unidirectional (UD) prepregs, and the UD prepreg/veil structure subsequently being compressed under heat.

In the examples disclosed herein, the average diameter of the fibers making up the fibrous veils (not to be confused with the attached graphite nano-platelets) is the same or similar to the average diameter of the fibers making up the prepregs. In one example, the average diameter of the fibers in the veils and the prepregs ranges from about 7,000 nm to about 9,000 nm. Such fibers are generally commercially available, and, in some instances, may be more desirable. It is to be understood that the fibrous veils may be made with smaller fibers, but, in some instances, such veils may be more difficult to prepare and more costly.

To further illustrate the example(s) disclosed herein, the following examples are given. It is to be understood that these examples are provided for illustrative purposes and are not to be construed as limiting the scope of the examples disclosed herein.

EXAMPLES

Molded panel samples were prepared according to the method disclosed herein (some with 5 micron exfoliated graphite nano-platelets (Samples 1a, 1b, and 1c), some with 15 micron exfoliated graphite nano-platelets (Samples 2a, 2b, and 2c) and some with a 1:1 weight ratio of both 5 and 15 micron graphite nano-platelets (Samples 3a and 3b)), and three comparative molded panel samples were prepared, one of which included no veils (Comparative Example 1), another of which included un-doped veils (Comparative Example 2), and still another of which included carbon nanofiber doped veils (Comparative Example 3).

The sample composites according to the method disclosed herein were made as follows. The exfoliated graphite nano-platelets were of different grades, each having a nominal size of 5 microns and 15 microns, respectively, and were supplied by XG Sciences. To prepare the exfoliated graphite nano-platelet (xGnP) containing veils, up to 2 g of the various types of xGnP (5 micron xGnP, 15 micron xGnP, or a blend of the two) were respectively dispersed into 125 ml to 175 ml of isopropyl alcohol by sonicating for 1 hour in an ice-water cooling bath. 0.2 g to 1 g of IPA-ST colloidal nano-silica/isopropanol solution by Nissan Chemical (30 wt % silica) was added to the isopropyl alcohol before sonicating in order to facilitate dispersion of the xGnP.

The dispersed solutions were transferred to respective square basins, and fibrous veils (Optimat 20103A (glass fiber, 17 g/m$^2$) supplied by TFP) were dipped into, and then taken out of the respective basins. The wet veils were dried by evaporating the alcohol for about 30 minutes at room temperature. The dry xGnP-containing veils were then weighed.

The unidirectional carbon fiber-epoxy prepregs used in these examples consisted of 35 wt % of resin and 65 wt % of 24K T700 carbon fibers, supplied by Patz Materials and Technologies. The aerial weight of the prepregs was 300 g/m$^2$.

Standard lay-up procedures were applied, and the lay-up arrangements were 0/90/0/0/90/0 for Comparative Example 1 and 0/V/90/0/V/0/90/V/0 for samples including veils (V=veil) (Samples 1a through 3b and Comparative Examples 2 and 3). Each of the laid-up composite samples was compression molded in a picture frame (254 mm×254 mm) and two flat plates at 1.4 MPa and 157° C. for 10 minutes. The nominal thickness of the molded panel composites with veils (i.e., Samples 1a through 3b and Comparative Examples 2 and 3) was about 1.85 mm and the nominal thickness of the molded panel composites without veils (i.e., Comparative Example 1) was 1.80 mm. The weight increases caused by adding veils and xGnP were less than 2.2 wt % of the composite panels.

Square specimens (100 mm×100 mm) were then cut from the laminated composite panels for impact testing. The impact tests were performed using a high-rate Instron machine equipped with a hemispherical impact plunger (20 mm in diameter). The impact speed of 0.5 m/sec was selected to provide enough energy to penetrate specimens after preliminary tests. From the load-displacement curve, the maximum load was found and the corresponding energy was calculated by numerical integration under the curve for each sample. The energy to penetration was obtained by integration to the penetration point beyond which the oscillation of the load is still present, but as a representation of hinge effects. The impact testing was videotaped at the back side of the sample using a high speed video camera to confirm the interpretation of the load-displacement curve.

Three typical load-displacement curves obtained from the impact tests are shown in FIG. 2. The graph depicts Load (in kilo Newtons) vs. Displacement (in millimeters) for samples without veils (Comparative Example 1), samples with veils alone (Comparative Example 2) and samples with veils having 5 micron xGnP (1.2 wt %, Sample 1a). The numbers used for the Samples and Comparative Examples are averaged from 2 to 3 of the same or similar samples with at least two tests having been performed for each sample. The impact curve for the sample panel without fibrous veils (Comparative Example 1) was adjusted slightly higher to take into account the thickness increase (0.05 mm or 3%) caused by the addition of veils in the other samples. It was found that the addition of xGnP onto the veils did not cause any measurable thickness change when compared to Comparative Example 2 (undoped veil). The data indicates that the overall impact behavior of the samples was not altered by the addition of veils (either with or without xGnP). However, the maximum load and impact energy were markedly increased for Comparative Example 2 containing the undoped fibrous veils only and further increased for samples containing fibrous veils doped with xGnP (e.g., Sample 1a).

The improvement in impact properties of the laminated composites including various amounts of xGnP is summarized in Table 1 (below) in terms of percent increase in maximum load, energy to maximum load, and energy to penetration. The concentration of xGnP was calculated as a weight percent of the total resin matrix in the composite samples. The results show that the method disclosed herein successfully achieved significant enhancement in impact properties of laminated composites using each of the different types and blend of xGnP.

TABLE 1

Impact properties of laminated composites (12K, T700 carbon fiber prepreg): Comparative Example 1 with no veils, Comparative Example 2 with un-doped veils, Sample 1 (including a, b, and c) with veils having 5 micron xGnP, Sample 2 (including a, b, and c) with veils having 15 micron xGnP, and Sample 3 (including a and b) with veils having a 1:1 weight ratio of 5 micron xGnP to 15 micron xGnP.

| | XGnP in | Max. Load | | Energy to Max. Load | | Energy to Penetration | |
|---|---|---|---|---|---|---|---|
| | resin Weight % | kN | % increase | J | % increase | J | % increase |
| Comparative Example 1 | 0.0 | 2.9 | 0 | 8.1 | 0 | 15.2 | 0 |
| Comparative Example 2 | 0.0 | 3.8 | 33 | 11.5 | 42 | 20.0 | 31 |
| Sample 1a | 1.2 | 4.1 | 44 | 12.5 | 55 | 26.3 | 73 |
| Sample 1b | 2.2 | 4.4 | 54 | 11.6 | 44 | 21.0 | 38 |
| Sample 1c | 3.2 | 3.8 | 32 | 9.9 | 23 | 21.7 | 42 |
| Sample 2a | 1.2 | 4.0 | 39 | 14.1 | 75 | 25.2 | 65 |
| Sample 2b | 2.3 | 4.2 | 44 | 11.2 | 39 | 22.7 | 49 |
| Sample 2c | 3.4 | 4.4 | 53 | 12.7 | 58 | 23.2 | 53 |
| Sample 3a | 1.2 | 4.4 | 51 | 13.3 | 65 | 25.9 | 70 |
| Sample 3b | 2.3 | 4.2 | 44 | 11.2 | 39 | 22.7 | 49 |

Figure 3:
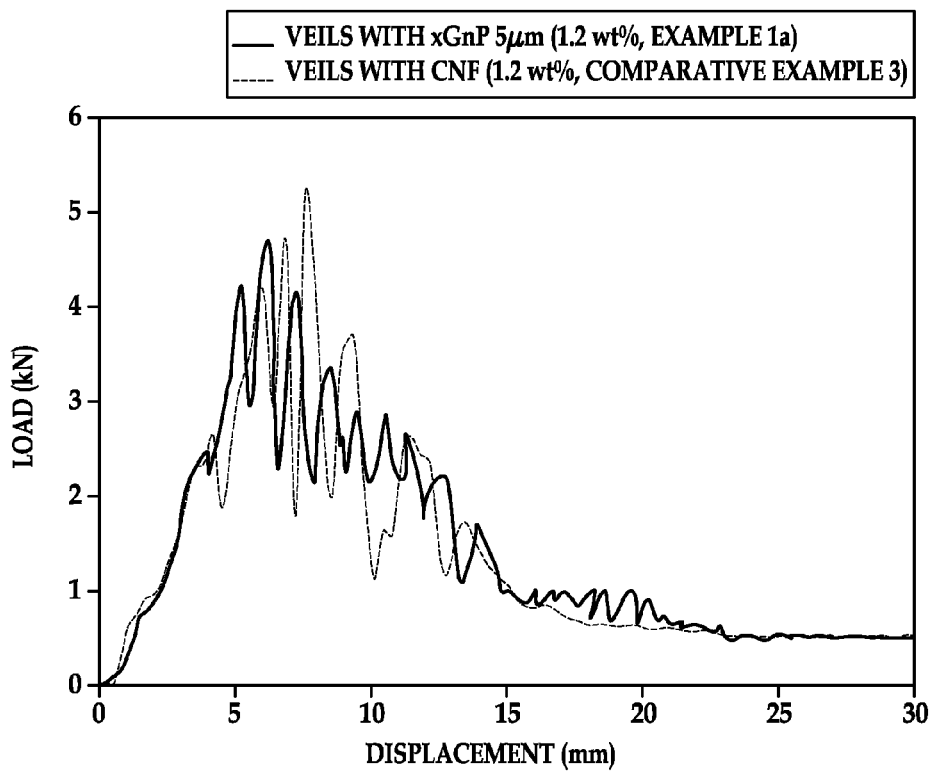
FIG. 3 is a graph of comparative impact load-displacement curves plotting Load (kN) vs. Displacement (mm) from a sample of the laminated composite disclosed herein and a comparative sample including carbon nanofiber doped veils.

The effectiveness of the addition of xGnP in impact property improvement is compared with laminated composites including carbon fiber-doped veils between the prepregs. This comparison is shown in FIG. 3. The enhancement in the impact properties of Sample 1a and Comparative Example 3 is similar, except that graphite nano-platelets are generally less expensive than carbon nanofibers.

While several examples have been described in detail, it will be apparent to those skilled in the art that the disclosed examples may be modified. Therefore, the foregoing description is to be considered exemplary rather than limiting.

The invention claimed is:
1. A laminated composite, comprising:
   a plurality of stacked prepregs having an interface formed between each pair of adjacent prepregs, each prepreg including a matrix material and reinforcing fibers dis- persed therein; and at least one fibrous veil laminated to at least a portion of at least one of the interfaces, the at least one fibrous veil having graphite nano-platelets attached to at least one surface thereof.

2. The laminated composite of claim 1 wherein the at least one fibrous veil having the graphite nano-platelets attached thereto adds a predetermined thickness to the composite.

3. The laminated composite of claim 2 wherein the predetermined thickness ranges from about 0.01 mm to about 0.1 mm.

4. The laminated composite of claim 1 wherein the graphite nano-platelets are exfoliated graphite nano-platelets.

5. The laminated composite of claim 1 wherein the reinforcing fibers are carbon fibers and the matrix material is a resin, wherein each of the prepregs includes at most 35 weight % of the resin and at least 65 weight % of the carbon fibers, and wherein the carbon fibers are selected from the group consisting of 12K carbon fibers, 24K carbon fibers, and combinations thereof.

6. The laminated composite of claim 1 wherein the at least one fibrous veil is a glass fibrous veil.

7. The laminated composite of claim 1 wherein an amount of the graphite nano-platelets in the laminated composite is less than 2.5 wt % of a total wt % of the laminated composite.

8. The laminated composite of claim 1 exhibiting an increase in at least one of maximum load, energy to maximum load, and energy to penetration.

9. The laminated composite of claim 1 wherein the at least one fibrous veil includes other reinforcing fibers, and wherein the reinforcing fibers and the other reinforcing fibers have an average diameter ranging from about 7000 nm to about 9000 nm.

10. The laminated composite of claim 1 wherein the reinforcing fibers of each of the plurality of stacked prepegs are selected from carbon fibers, glass fibers, boron fibers, and polymeric fibers, and wherein the matrix material of each of the plurality of stacked prepregs is a resin selected from epoxy resins, phenolic resins, polyester resins, vinyl ester resins, polyimide resins, and thermoplastic resins.

11. A method of making an impact-resistant laminated composite, the method comprising:
    doping a surface of at least one fibrous veil with graphite nano-platelets to attach the nano-platelets thereto;
    laminating the at least one fibrous veil to at least a portion of an interface formed between each pair of adjacent prepregs, the pairs of adjacent prepregs included in a plurality of stacked prepregs, each prepreg including reinforcing fibers dispersed in a matrix material; and
    molding the laminated plurality of prepregs and at least one fibrous veil into the composite.

12. The method of claim 11 wherein the reinforcing fibers are carbon fibers and the matrix material is a resin, wherein each of the prepregs includes at most 35 weight % of the resin and at least 65 weight % of the carbon fibers, and wherein the carbon fibers are selected from the group consisting of 12K carbon fibers, 24K carbon fibers and combinations thereof.

13. The method of claim 11 wherein the graphite nano-platelets are exfoliated graphite nano-platelets.

14. The method of claim 11 wherein doping the surface of the at least one fibrous veil with the graphite nano-platelets is accomplished by:
    dipping the at least one fibrous veil in a solution containing the graphite nano-platelets dispersed therein; and
    drying the at least one fibrous veil having the graphite nano-platelets attached thereto.

15. The method of claim 14 wherein the solution includes isopropyl alcohol, a dispersant, and a mixture of colloidal nanosilica and isopropanol.

16. The laminated composite of claim 1 wherein each of the plurality of stacked prepegs has a structure selected from a unidirectional structure, a woven fabric structure, and a multi-axial fabric structure.

17. A laminated composite, comprising:
    a plurality of stacked prepregs having an interface formed between each pair of adjacent prepregs, each prepreg including a matrix material and reinforcing fibers dispersed therein, wherein the reinforcing fibers are carbon fibers, and the matrix material is a resin, wherein each of the prepregs includes at most 35 weight % of the resin and at least 65 weight % of the carbon fibers, and wherein the carbon fibers are selected from the group consisting of 12K carbon fibers, 24K carbon fibers, and combinations thereof; and
    at least one fibrous veil laminated to at least a portion of at least one of the interfaces, the at least one fibrous veil having graphite nano-platelets attached to at least one surface thereof;
    wherein the at least one fibrous veil includes other reinforcing fibers;
    and wherein the reinforcing fibers and the other reinforcing fibers have an average diameter ranging from about 7000 nm to about 9000 nm.

* * * * *